US009146134B2

(12) United States Patent
Lokshin et al.

(10) Patent No.: US 9,146,134 B2
(45) Date of Patent: Sep. 29, 2015

(54) DEVICE AND METHOD OF GYRO SENSOR CALIBRATION

(75) Inventors: Anatole M. Lokshin, Huntington Beach, CA (US); Vitaly Kuzkin, Saint Petersburg (RU); Nikolay Dvas, Saint Petersburg (RU)

(73) Assignee: AlpineReplay, Inc., Huntington Beach, CA (US)

( * ) Notice: Subject to any disclaimer, the term of this patent is extended or adjusted under 35 U.S.C. 154(b) by 820 days.

(21) Appl. No.: 13/291,844

(22) Filed: Nov. 8, 2011

(65) Prior Publication Data

US 2012/0116716 A1  May 10, 2012

Related U.S. Application Data

(60) Provisional application No. 61/456,467, filed on Nov. 8, 2010.

(51) Int. Cl.
G01C 19/00 (2013.01)
G01C 25/00 (2006.01)
G01C 17/38 (2006.01)
G01C 21/28 (2006.01)

(52) U.S. Cl.
CPC ............ G01C 25/005 (2013.01); G01C 17/38 (2013.01); G01C 19/00 (2013.01); G01C 21/28 (2013.01); G01C 25/00 (2013.01)

(58) Field of Classification Search
USPC ............................................ 702/92, 93, 150
See application file for complete search history.

(56) References Cited

U.S. PATENT DOCUMENTS

| 5,297,050 A | 3/1994 | Ichimura et al. |
| 5,345,382 A | 9/1994 | Kao |
| 5,452,869 A | 9/1995 | Basuthakur |
| 5,562,266 A | 10/1996 | Achkar |
| 5,991,692 A | 11/1999 | Spencer, II |
| 6,729,176 B2 | 5/2004 | Begin |
| 7,393,422 B2 | 7/2008 | Nagao |
| 7,657,183 B2 | 2/2010 | Drago |

(Continued)

FOREIGN PATENT DOCUMENTS

| EP | 1310770 | 5/2003 |
| EP | 2306149 | 4/2011 |

(Continued)

OTHER PUBLICATIONS

International Patent Application Serial No. PCT/US2011/059825, International Search Report and Written Opinion, Jun. 1, 2012.

(Continued)

Primary Examiner — Sujoy Kundu
Assistant Examiner — Paul D Lee
(74) Attorney, Agent, or Firm — Greenberg Traurig LLP

(57) ABSTRACT

Embodiments of the present disclosure are directed to a method and apparatus for calibration of gyro sensors by using magnetic sensor measurements and background computation during normal product operation. In one embodiment, magnetic sensor measurements are used to adjust gyro gain by comparing measured magnetic vector orientation with its expected orientation computed from gyro integration. The background process constantly compares this discrepancy for various values of gyro gain and selects the one that minimizes such error on average. In one embodiment, device orientation obtained by gyro integration is improved by using magnetic sensor measurements.

8 Claims, 6 Drawing Sheets

(56) References Cited

U.S. PATENT DOCUMENTS

| | | |
|---|---|---|
| 7,667,645 B2 | 2/2010 | Tekawy |
| 8,351,773 B2 * | 1/2013 | Nasiri et al. .................. 396/55 |
| 2003/0137433 A1 | 7/2003 | Schiller et al. |
| 2004/0020064 A1 | 2/2004 | Levi et al. |
| 2004/0064252 A1 * | 4/2004 | Kirkland et al. .............. 701/220 |
| 2005/0242947 A1 * | 11/2005 | Burneske et al. ........ 340/539.13 |
| 2007/0055468 A1 | 3/2007 | Pylvanainen |
| 2009/0070056 A1 | 3/2009 | Vocali |
| 2009/0119016 A1 * | 5/2009 | Tanino et al. ................ 701/221 |
| 2011/0066392 A1 * | 3/2011 | Judd ............................. 702/93 |
| 2011/0178707 A1 * | 7/2011 | Sachs et al. .................. 701/216 |

FOREIGN PATENT DOCUMENTS

| | | |
|---|---|---|
| JP | 2243917 | 9/1990 |
| JP | 5187880 | 7/1993 |
| JP | 2006038650 | 2/2006 |
| WO | 0237827 | 5/2002 |

OTHER PUBLICATIONS

International Patent Application PCT/US2011/059825, International Search Report and Written Opinion, Jun. 1, 2012.

The Extended European Search Report 11840257.7, Feb. 20, 2014.

* cited by examiner

DEVICE AND METHOD OF GYRO SENSOR CALIBRATION

RELATED APPLICATIONS

This application claims the benefit of priority of U.S. Provisional Application No. 61/456,467, filed Nov. 8, 2010, the content of which is hereby incorporated by reference in its entirety.

BACKGROUND OF THE DISCLOSURE

1. Field of the Disclosure

The present disclosure relates to devices incorporating magnetic sensors and more particularly to systems including inertial gyroscopic sensors.

2. State of the Art

Low cost inertial and other sensors became very popular in numerous consumer electronic devices such as smart phone, game controllers, and many others. This imposes very challenging requirements on the developers. The less expensive are products, the less technically sophisticated its customer can be expected and the product should provide robust and care-free operating experience even while using low cost low precision sensors.

It is a common practice in the device manufacturing, to calibrate all the sensors employed by the device at the time of device manufacturing before it is shipped to the customer. Such, so called factory calibration, can be performed very accurately using special equipment, controlled environment, and trained personnel. However, by the time the product is used by the customer the sensor calibration is off due to the temperature change, different battery voltage, and other effects that are beyond control of the design engineers.

This issue of proper calibration is especially important for the sensors, which, in order to be used in the navigation or attitude determination solution, need to be integrated over time. With integration calibration errors grow with time and make the resulted solution very quickly unacceptable.

This means that to ensure proper device operation, for every sensor used in the device, there should be an appropriate sw and algorithms that allow for autonomous real time calibration of such effects as signal drift, and effective gain change which happen during normal device operation due to the environmental effects listed above. In other words, a practical design must incorporate internal algorithms that autonomously monitor and adjust sensor calibration parameters in real time.

This also means that there should be methods that allow reducing the effect of integrated sensor error.

It is, therefore, an object of the present disclosure to resolve one or more of the foregoing difficulties by providing a method that automatically adjusts calibration parameters of the gyro sensors in real time during normal device operation.

It is also an object of this disclosure to provide a method that allows reduction of error in gyro integration.

A typical system today has a full set of sensors such as 3-axis accelerometer, 3-axis magnetic sensor, and 3-axis gyro sensor. All these sensors need to be calibrated to allow effective use. The most common way of accelerometer calibration is to use time moments when system is stationary and to use the gravity vector as the natural standard to determine accelerometer bias and gain. These stationary situations can be set up by the user during user calibration or detected during real time operation, e.g. via "zero motion detector" as in U.S. Pat. No. 5,991,692 since in a stationary position only gravity vector effects accelerometer readings. Using multiple measurements with device in different orientation, a full accelerometer calibration can be performed. As an example see U.S. Pat. No. 6,729,176.

Magnetic sensors are commonly calibrated using the natural Earth magnetic field. The calibration can be done by recording measurements in several predetermined device orientations, or as a background process using operational or user calibration device 3D motion, e.g., US Patent Application Publication No. 20090070056. Such procedure creates new calibration parameters every time the calibration is performed.

Since GPS sensor became widely used and very common in navigation systems where magnetic sensors are employed, it is often used for the calibration of magnetic sensors by comparing GPS velocity vector direction with the direction obtained from the magnetic sensor. Then direct computation of Kalman Filter procedure is used to derive the required calibration parameters for the magnetic sensors.

There is a significant body of work that allows a person who is of ordinary skills in the art, to derive an appropriate procedure to accurately calibrate magnetic and accelerometer sensors used in the device by using natural and ever present forces of Earth Gravity and Earth Magnetic field which are well known and tabulated with high accuracy at any location on the Earth, and by using such additional sensors as GPS and Temperature.

As anyone skillful in the arts is aware, when device orientation is derived from the measurements of the well calibrated magnetic and gravity sensors, each attitude determination is independent. Therefore, unavoidable errors in determination of the magnetic and gravity vector directions are not accumulated in time. Quite opposite, by smoothing the resulted trajectory the orientation error in each trajectory point can be reduced.

However, in the situations when device experiences an unknown acceleration, the internal accelerometers cannot be used to determine device orientation relevant to the Earth gravity vector. Magnetic vector alone is not sufficient to restore device orientation, nor a single antenna GPS can be used to restore body orientation. In such cases one has no alternative but to employ gyro sensors to determine device 3D orientation.

The Gyro sensors are measuring a rate of turn around its local coordinate axis. When properly integrated, this provides a total 3D body rotation from its initial orientation. However, since gyro signal must be integrated to obtain orientation any error in gyro bias or gain rapidly grows in time.

Gyro bias can be determined by observing gyro signals at the moment when there is no rotation is present, assuming that such moments can be detected. However, to calibrate gyro gain one needs to perform very accurate and well known rotation around each axis which is difficult to perform even in factory setting and all but impossible for the in-field real time calibration.

Tekawy, et al., U.S. Pat. No. 7,667,645, U.S. Pat. No. 7,393,422 is using power difference from different GPS satellites in multiple GPS antennas to calibrate gyro drift.

Drag, et al., U.S. Pat. No. 7,657,183, uses optical sensors as a primary method of orientation. This patent mentions that gyro can be calibrated using these optical signals but does not explain how it can be done.

Achkar, et al., U.S. Pat. No. 5,562,266, is also using Sun and North Pole detectors to estimate gyro drift (bias) via a Kalman Filter, which is also similar to the method used by Basuthakur, et al, U.S. Pat. No. 5,452,869

Therefore, at the present, the gain calibration methods need to rely on the external determination of the device trajectory orientation, usually GPS for vehicle, star finder for satellites, or sonar for underwater apparatus. However, such methods don't work when device experiences rotation which is independent on its trajectory which is a common case for the hand held devices.

It is an object of the present disclosure to provide a practical and efficient method that automatically adjusts calibration parameters of the gyro sensors in real time during normal device operation. It is also an object of this disclosure to provide a practical and efficient method of improving accuracy of the device orientation determination.

SUMMARY OF THE DISCLOSURE

The present disclosure instructs anyone who is proficient in the art, how to perform the appropriate real time computations which employs measurements of the magnetic sensors, prior calibrated by any of the methods that are known to those who are proficient in the arts, and integration of the gyro sensors, to determine correction to the gain of the gyro sensors.

This disclosure observes that if gyro sensors are properly calibrated, then the device rotation computed by a proper integration of the gyro signals, should rotate the magnetic vector components from their orientation at the moment when the integration starts to their observed orientation at the moment when the gyro integration ends. Then any measure of mismatched between the observed and rotated magnetic vectors can be used to improve calibration of the gyro sensors.

With such measure of closeness established, the current disclosure teaches that the larger the gyro calibration error, the larger this measure of mismatch to become and that the minimum of this measure corresponds to the best calibration of the gyro sensors. Therefore, if one builds dependence between the employed gyro parameters and the error between the measured and estimated orientation of the magnetic vector, the correct value of the gyro calibration parameters will yield a minimum to this surface.

This disclosure also instructs those who are of ordinary skills, that device orientation, computed by gyro integration can be improved by making sure that the computed rotation is consistent with the observed orientation of magnetic vector.

One embodiment of the present disclosure is a device that includes a microprocessor having an associated memory; at least two sets of independent sensors in the device capable of sensing device 3D orientation, and/or 3D motion where at least one sensor set is not well calibrated at the beginning of device motion; and a microprocessor program operable in the microprocessor. This program performs steps of a) reading, storing, and processing sensor data from the sensors at a sequence of time moments t=0, 1, ... k; b) estimating device 3D orientation at time t=k using sensor data at t=0, 1, ..., k; c) forecasting a next time moment t=(k+1) value of one set of the above mentioned sensors by using sensor measurements for the previous time moments: t=m, ..., k 0<=m<=k; d) constructing a difference between forecasted and observed sensor values; and e) using the difference to continuously improve determination of the above estimated device 3D orientation and/or for the calibration of the set of sensors that was not well calibrated at the beginning of the device motion.

In one embodiment of the device, the sensor sets are a magnetic set and a gyro set. In one embodiment the gyro sensor set is not well calibrated at the beginning of the device motion.

In one embodiment a method of calibration of the gyro sensor set comprises: observing gyro sensor signals over a predetermined time period; correcting gyro signals by applying one of a first guess of the unknown gyro calibration parameters or their nominal values; determining a perceived change of the device orientation during this time period based on the observed and such corrected gyro signals; comparing magnetic sensor values at the beginning and the end of an integration period, appropriately corrected by the derived change of device orientation; and correcting gyro calibration parameters initial values by applying correction derived from a measure of difference between the observed and nominal rotation corrected magnetic signals.

In one exemplary embodiment of the device, only one calibration parameter is determined for all gyro channels. The calibration parameter may be an unknown gyro gain correction to the nominal values. In one embodiment the calibration parameter may be an unknown gyro bias correction to the nominal values.

In another embodiment, multiple calibration parameters may be determined. In such an embodiment the calibration parameters may be unknown gain corrections for each of the gyro sensors. Alternatively the calibration parameters may be unknown bias corrections for each of the gyro sensors. In another embodiment, the calibration parameters are a combination of unknown bias corrections and unknown gain corrections for all gyro sensors.

In another embodiment the measure of the difference between the magnetic signal at the end of the time period and the rotation corrected value of the magnetic vector at the beginning of the time period is a vector norm of the vector difference of these two vectors. In an embodiment, at the same time interval multiple alternative rotations may be determined with different assumed values of the gyro parameters under calibration. Alternatively, at different time intervals different values of the gyro calibration parameters may be used for the rotation determination. In such cases, correction parameter values may be selected by the method of Optimal Experiment Design.

In one embodiment calibration parameters may be determined by finding such parameter combination that yields a minimum to the computed measure of difference between the observed and rotation corrected magnetic signals. Alternatively all computations may be done off line with the data that was recorded for one set of calibration parameters and then recomputed with artificial change in the calibration parameters.

In one embodiment a method of determination of the device rotation in accordance with the present disclosure includes observing gyro sensor signals over a predetermined time period; correcting the gyro signals by applying gyro calibration parameters; determining a perceived change of the device orientation during this time period based on the observed and such corrected gyro signals. The method further includes observing magnetic sensor signals at the beginning and the end of this time period; correcting magnetic sensor signal by applying magnetic calibration parameters; determining a perceived change of the device orientation during this time which is consistent with the observed change in the calibration corrected magnetic sensor signals and is the closest to the rotation determined from the gyro signals; and determining the device rotation during this time interval as a combination of the rotation derived from the gyro sensors and a rotation that is consistent with the magnetic sensor observations.

In such embodiments, the rotation closeness measure is a norm of quaternion difference between the quaternion that is computed from the gyro signal integration and a quaternion that provides device rotation that is consistent with the magnetic sensor observations. The computation may be done off line using recording of the sensor values during an actual motion.

DETAILED DESCRIPTION

Figure 1:
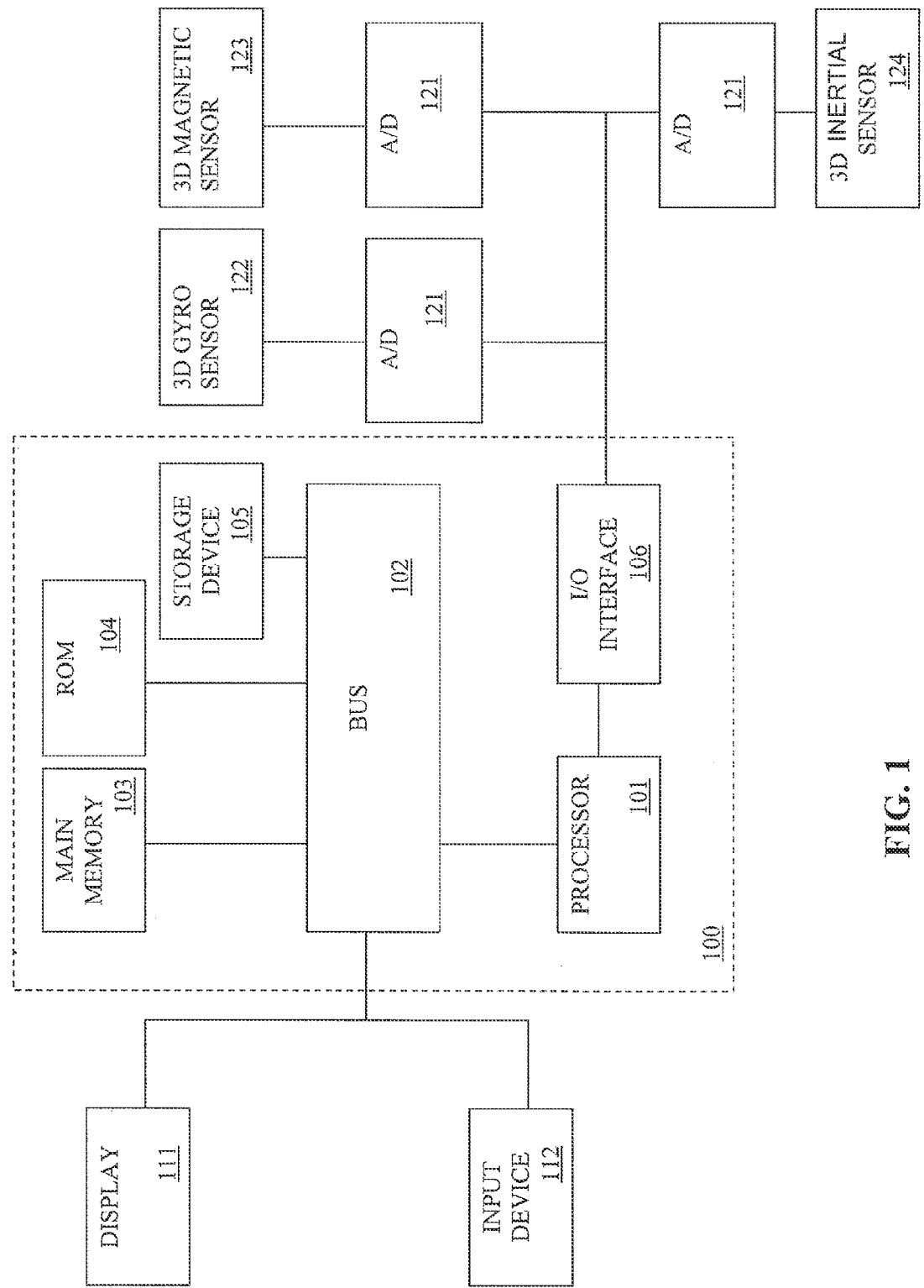
FIG. 1 depicts a device that consists of a microcomputer (100) which includes Processor (101), Memory Bus (102), Memory (103), (104), (105), and I/O interface (106). Microcomputer has Display (111) and Input Device (112). I/O Interface is connected to a bank of sensors with their ND converters (121): 3 axis Gyro sensors (122), 3 axis Magnetic Sensors (123) and 3 axis Accelerometers (124). CPU is sampling all the sensors via I/O (106) and stores the corresponding values in the Storage Device (105) or in the Main Memory (103). The appropriate computer program, that processes such obtained sensory data is stored in ROM (104) and is executed by CPU (101).
Figure 2:
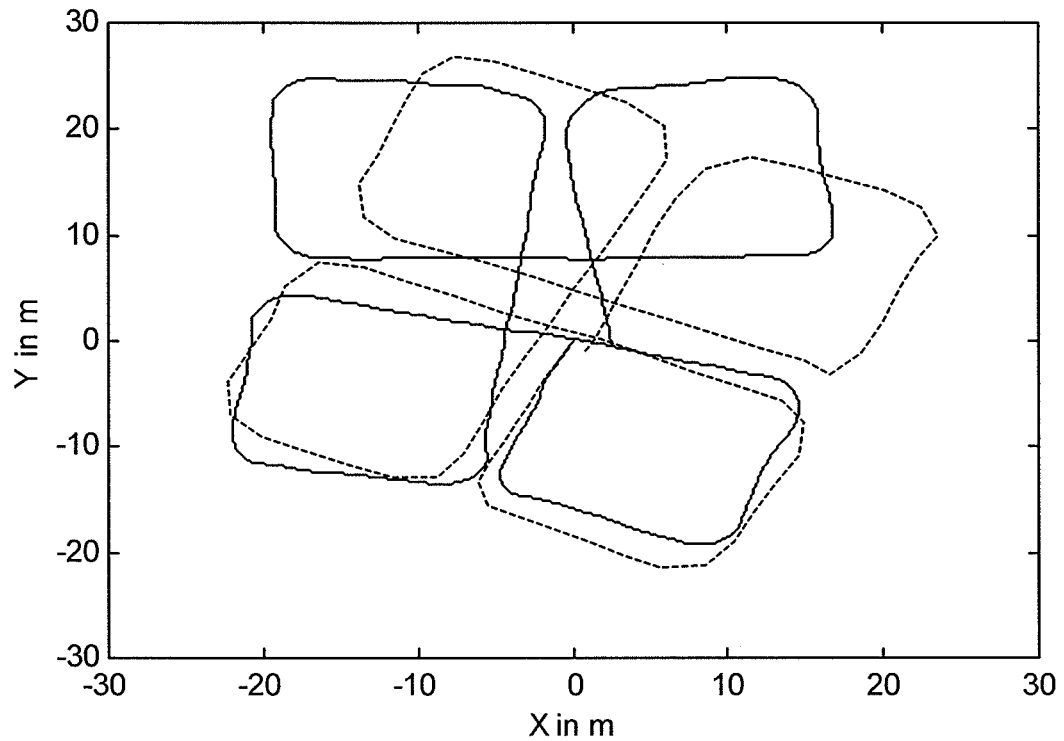
FIG. 2 shows a trajectory restoration via gyro integration when nominal gyro gain provided by the manufacturer was used. Dash line shows the true trajectory.
Figure 3:
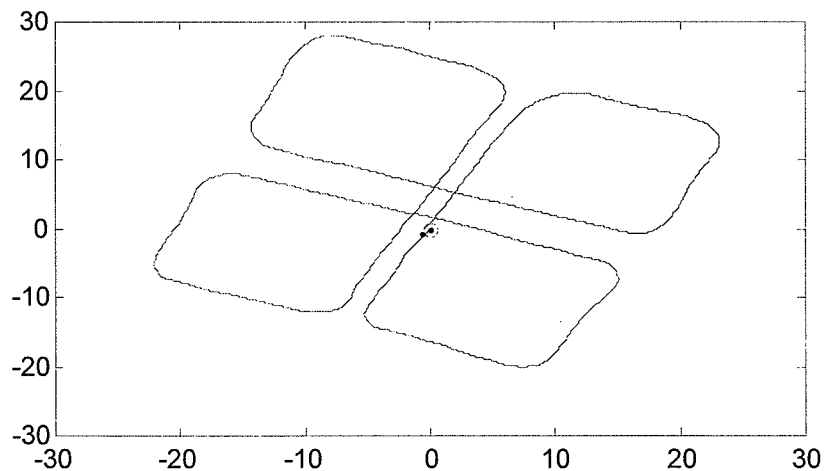
FIG. 3. provides the same trajectory restoration when an optimal gain found with one implementation of the presented method was applied.

In the following description, numerous specific details are set forth in order to provide a more thorough disclosure. It will be apparent, however, to one skilled in the art, that the art disclosed may be practiced without these specific details. In some instances, well-known features may have not been described in detail so as not to obscure the art disclosed.

In a preferred implementation we use quaternion arithmetic for rotation determination. However, this selection does not constrain the disclosure and is used for the illustration purposes only. Those who are proficient in the art know that there are other rotation representations such as Rotational Matrix, Euler angles, or other methods.

Quaternion is an ordered set of four real numbers q=(a,b,c,d) that has some particular mathematical properties. A detailed description of quaternion can be found in numerous textbooks on the subject. For our purpose we use unit quaternion.

$$\text{norm}(q)=\text{sqrt}(a*a+b*b+c*c+d*d)=1 \tag{1}$$

Union quaternion represents rotation around a unit vector e=(e1,e2,e3) by an angle α

$$q=[\cos(\alpha/2),\sin(\alpha/2)*e] \tag{2}$$

So if there a vector m=[mx,my,mz] represented in the coordinate system (x,y,z) is rotated around vector e by angle α, then the new coordinates of vector m are $$m'=q*m*q' \tag{3}$$

In quaternion representation a rigid body rotation can be represented by the following differential equation $$dq(t)/dt=0.5*\omega(t)*q(t) \tag{4}$$

Where ω=[ωx, ωy, ωz] is a vector of angular rate of rotation in the body coordinate system which is what is measured by the properly calibrated gyro sensors.

The solution of this differential equation can be obtained numerically using such methods as Runge-Kutta or any other method known to the knowledgeable in the arts. At the same time one needs to take into consideration that when a rigid body is rotated first by a quaternion q1 and then by a quaternion q2 then the total rotation can be represented by their ordered product $$q12=q2*q1 \tag{5}$$

Suppose that at the time moment T=t0 the magnetic vector measurements in the unit coordinate frame are $$m0=[mx0,my0,mz0] \tag{6}$$

and at the time T=tk the measured magnetic vector has the following internal components $$mk=[mxk,myk,mzk] \tag{7}$$

The rotation from T=t0 to T=tk can be computed by integrating equation (4) under constraints (5). Suppose that this integration produced quaternion qk. Then, using eq. (3) the expected composition of the magnetic vector in the rotated coordinate system should be $$mk\_est=qk*m0*qk' \tag{8}$$

At this point one can compare the observed and estimated value of magnetic vector and to create a measure of closeness. As a method of illustration we will use a vector norm of the difference of these two vectors $$em(k)=\text{norm}(mk-mk\_est) \tag{9}$$

This operation can be performed at the next time interval t(k)–t(k+1), etc. As a result, one can compute accumulated error measure $$Em=em(k)+em(k+1),\ldots,em(k+n) \tag{10}$$

The raw gyro sensor measurements are digital values of the voltage or current generated by the sensor. These values are denoted as g=[gx, gy, gz]. These values are related to the angular rotation rate w that is used in eq (4). It is commonly known by the experienced in the art, that the vectors w and g are related by a linear relationship for each of their components as the following:

$$gk=ck*\omega k+bk; k=x,y,z \tag{11}$$

Therefore, the angular rate ω, which is used in eq (4) can be derived from the gyro raw signals as $$\omega k=ck*gk-bk; k=x,y,z \tag{12}$$

In the equation (12) ck represents gyro gain, and bk is gyro bias. The values of ck and bk should be accurately known at the time of device operation in order to allow correct determination of the device orientation. While these parameters are often determined during factory calibration their actual values during operation are slightly different. Suppose the actual value of ω differs from the value computed as eq (12) by a small gain correction µ which is unknown.

$$\omega' = (1+\mu)*\omega \quad (13)$$

To determine the unknown parameter µ we propose to run several gyro integrations (4) in parallel or in sequence, with several different values of p. In the preferred implementation, as an illustration but not as a limitation, three integrations are run in parallel with µ0=0, µ1=+d, µ2=−d, where d is a small positive number 0<d<<1. The results of the integration with µ=0 is used for the device operation while the other integrations are run on the background and their results are used for the determination of the true value of µ as described below.

Figure 4:
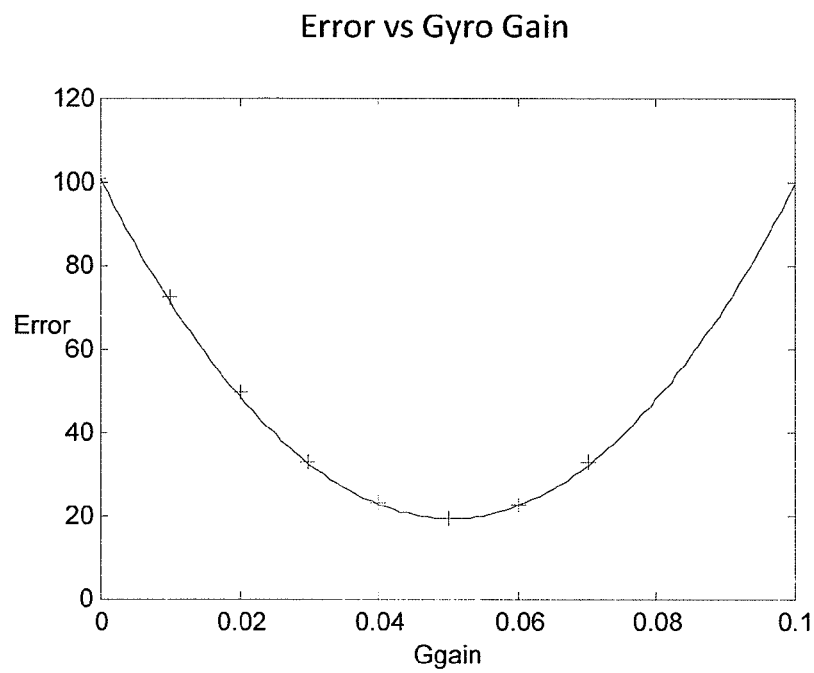
FIG. 4 depicts a graph of the experimental data on how Error in Magnetic vector restoration depends on the Gyro Gain variation from its manufacturer nominal value.
Figure 6:
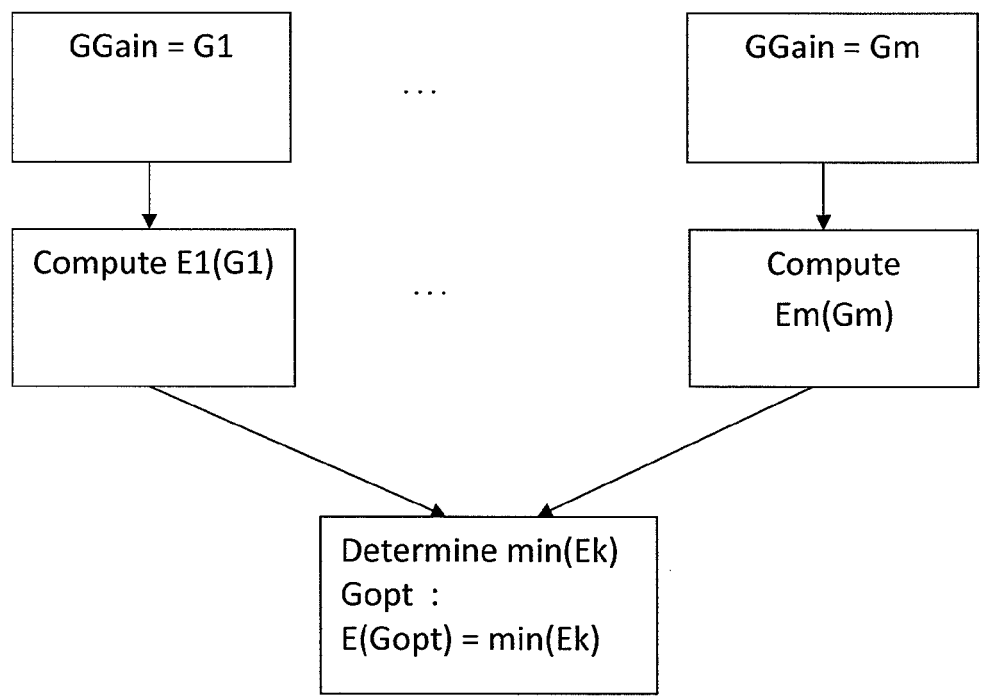
FIG. 6 depicts how optimal value of the Gyro Gain is computed from multiple Error values obtained for different values of Gyro Gain.
Figure 5:
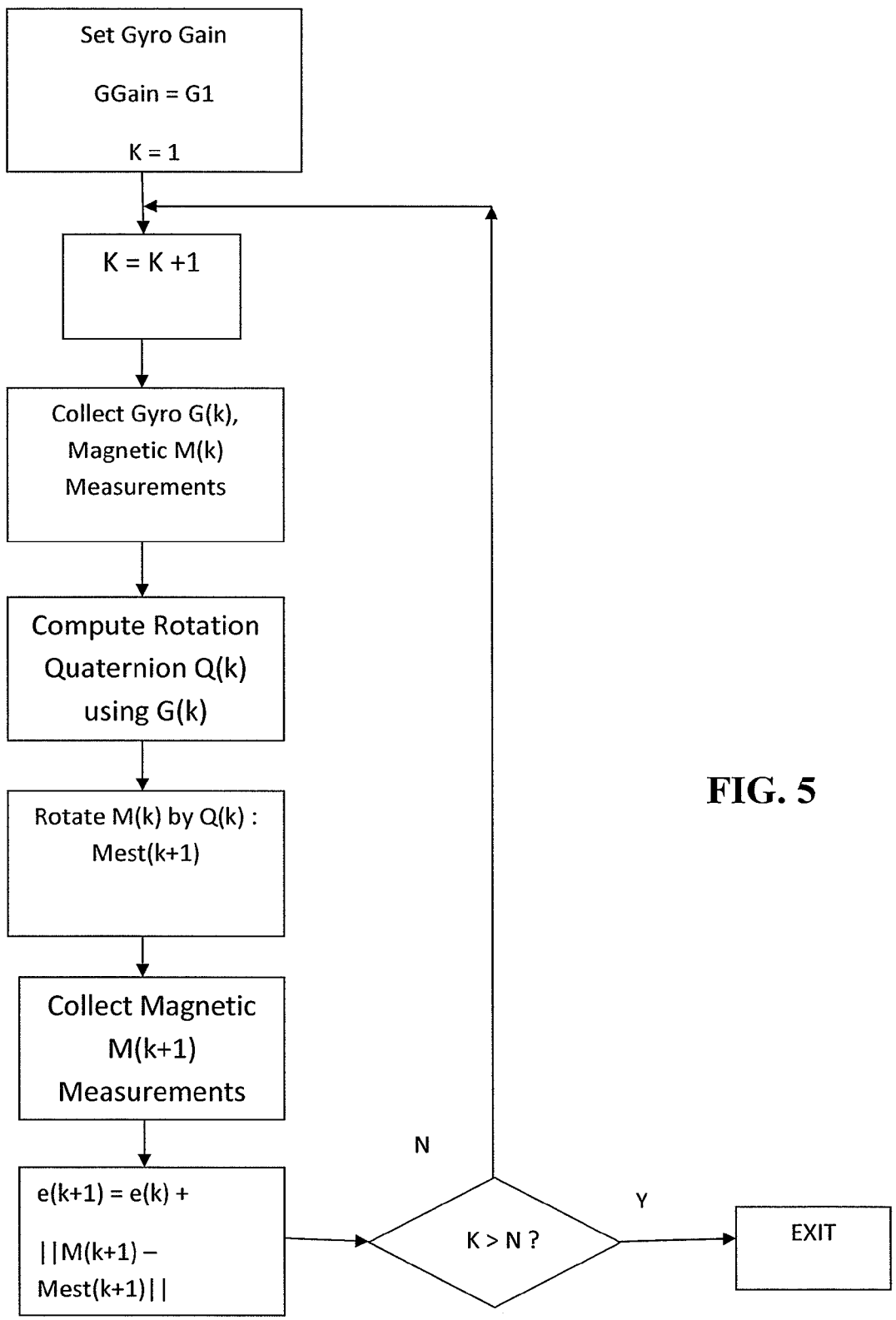
FIG. 5 provides algorithm flow chart on how Error of magnetic vector restoration is computed in real time.
Figure 7:
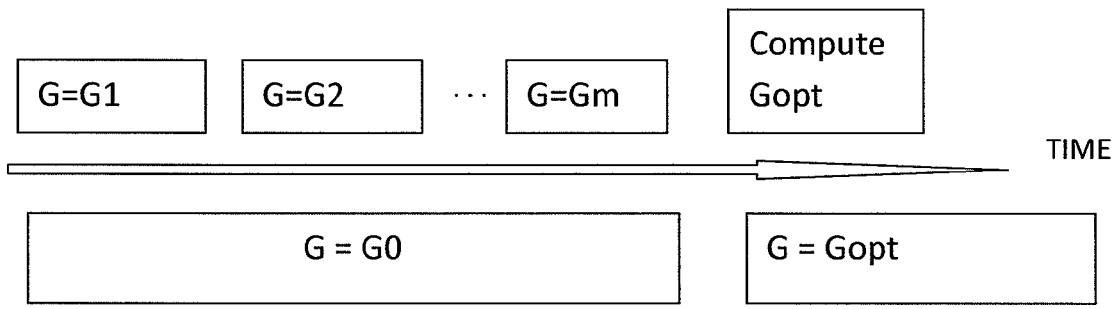
FIG. 7 shows that multiple Error values can be computed in parallel or in serious depending on the CPU capabilities. The actual trajectory computation are first performed using a nominal manufacturer gain value G0 and then switched to the optimal gain Gopt as soon as it becomes available.
Figure 7:
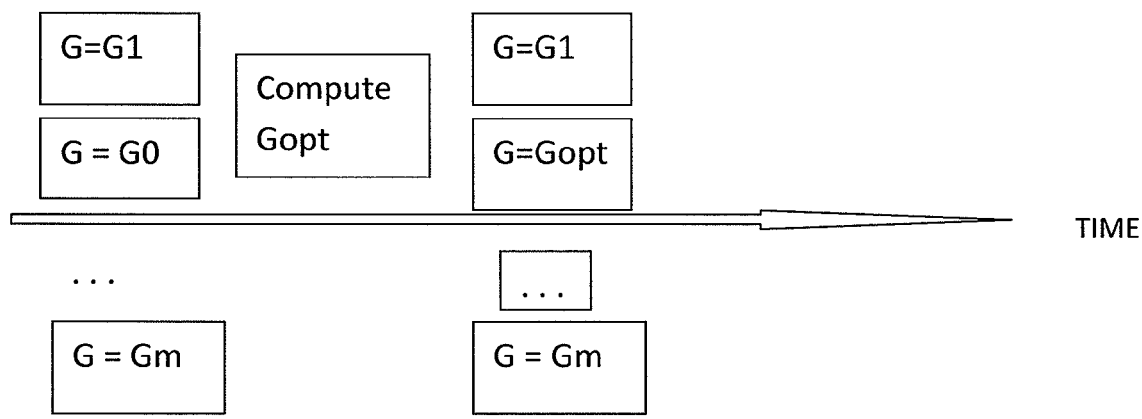

The closeness measure Em—eq (10), is computed for each of these integration. As a result, the set {Em(k), m(k)} constitutes a dependence curve Em vs µ as illustrated in FIG. 4. Then an optimal value of µ that yields the minimum to this function can be found using quadratic fit or any other function minimum determination method that is known to those proficient in the arts. FIG. 4 shows a quadratic fit and its minimum as found on the data collected during operation of some actual device.

After the optimal value of µ=µ* is found, it is used for the nominal integration: µ0=µ*, µ1=µ*+d, µ2=µ*−d, and the whole process continues so any possible real time change in gyro gain get detected immediately.

The presented illustration determines only one parameter as a min of a single variable function. However, a similar procedure can be performed if more parameters need to be estimated. Indeed, suppose that one wants to find correction parameters µ for each of three gyro axis individually—µx, µy, µz. Then, instead of repeating the same patent of 3 parallel integrations with corrections [0,0,0], [d,d,d], and [−d,−d,−d] one can change one parameter for each run, e.g. [0,0,0], [d,d,d], [−d,−d,−d] for the first run, then after a an optimal common factor µ* is determined as described above, the next run can be done with parameters [0,0,0], [d,0,0], [−d,0,0], so additional correction µx* is determined, then µy* and so on.

Alternatively, one can design an experiment where all three parameters are determined in each run by employing extra parallel integrations. Since the computational load to resolve eq (4) is not significant, a parallel computation of the multiple threads at the same time is quite achievable with today microprocessors typically used in such systems.

In another implementation only one integration thread for one value of µ is performed each time and then results of several integrations are compared even if these integration were performed at different time.

Even when all calibration parameters are optimized, the gyro signals have unavoidable noise which integration lead to orientation errors that grow with time proportionally to the square root of time of integration. These errors can be reduced but not eliminated by using Dead Zone technique, where any gyro signal which is smaller than some predetermined threshold is forced to zeros. The dead Zone technique improves the overall SNR (Signal to Noise Ratio) but does not eliminate the full effect of the noise integration.

Therefore, to alleviate the above mentioned difficulties, this disclosure teaches how to improve orientation determination using magnetic vector in addition to the gyro integration.

If the magnetic sensors are properly calibrated, then one expects that the rotation computed from the gyro integration according to the eq (4)-(5) should be consistent with a rotation that brings vector m(t0) into m(t). Lg is a quaternion computed from the eq (4)-(5).

A rotation that rotates vector m from m0 to m1 can be performed with a quaternion Lm:

$$m0e=m0/\text{norm}(m0); m1e=m1/\text{norm}(m1);$$

$$e=m0e \times m1e;$$

$$\alpha = a\cos(m0e \text{ dot } m1e)$$

$$Lm=[\cos(\alpha/2), \sin(\alpha/2)*e] \quad (14)$$

An additional rotation around new vector m1 is possible without changing vector m1. This additional rotation can be represented by a quaternion Lr $$Lr=[\cos(\beta/2), \sin(\beta/2)*m1e] \quad (15)$$

Where β is an angle of additional rotation, not defined at this moment. This disclosure teaches, that the angle β should be selected such, that the total rotation by quaternion Lm and Lr, (denote it as Le(β)) should be the closest to the rotation Lg $$Le(\beta)=Lr(\beta)*Lm \quad (16)$$

In the preferred implementation of this disclosure for the measure of quaternion closeness the norm of a quaternion difference is selected. Therefore, an additional rotation β is determined from minimization of norm(Lg−Le(β))

$$\beta \to \min(\text{norm}(Lg-Le(\beta))) \quad (17)$$

Eq. 17 can be solved by many methods familiar to those proficient in the arts. Let the minimal value of (17) is achieved at β=β*.

Figure 8:
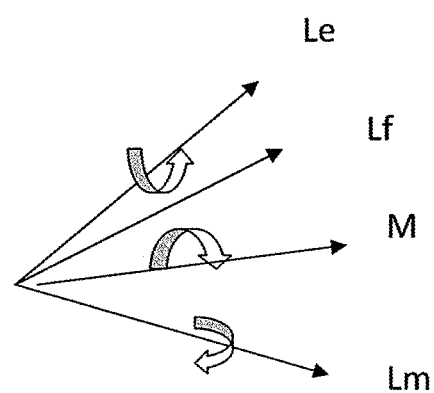
FIG. 8 illustrates how rotation obtained from the Gyro Integration—quaternion Le, can be improved by computing rotation Lf which is consistent with the observed resulted orientation of the magnetic vector M and is the closest to the Gyro rotation Le. Quaternion Lm provides a rotation that rotate magnetic vector M from its observed position M(k) to the shown orientation M(k+1) which is its observed orientation at t=k+1. Quaternion Lf is then constructed of two rotations—Lm and an additional rotation around M.

Therefore, at the end of each gyro integration step, there are two quaternion that potentially describe rotation: Lg and Le(β*). There are multiple ways how these two quaternion can be used—e.g., as a weighted sum with the weights inverse proportional to the estimated accuracy of each quaternion. The preferred implementation is using an average of these two quaternion. FIG. 8 shows improvement that the preferred implementation of this disclosure achieved for a test case rotation in controlled conditions.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

We claim:

1. An electronic device comprising:
   a microprocessor communicating with a memory;
   a gyroscopic sensor for determining a rotational position of the electronic device;
   a stored gain parameter that is adapted to be applied to gyroscopic sensor data produced by the gyroscopic sensor, wherein the stored gyroscopic sensor gain parameter is a first stored gyroscopic sensor gain parameter of a plurality of stored gyroscopic sensor gain parameters;
   a magnetic sensor for determining the rotational position of the electronic device; and
   the memory storing instructions configured to instruct the microprocessor to perform operations as part of a feedback process, the operations comprising:
      integrating a time-series set of gyroscopic sensor data associated with a period of time from the gyroscopic sensor;

measuring a time-series set of magnetic sensor data associated with the period of time from the magnetic sensor;

comparing the integrated gyroscopic sensor data from the period of time with the magnetic sensor data from the period of time to create an error measure for the period of time;

determining an updated gyroscopic sensor gain parameter based on the error measure;

adjusting the stored gyroscopic sensor gain parameter to the updated gyroscopic sensor gain parameter;

wherein integrating the time-series of gyroscopic sensor data is performed using each of the plurality of stored gyroscopic sensor gain parameters to create a plurality of gain-adjusted integrated gyroscopic sensor data, wherein comparing the integrated gyroscopic sensor data include comparing each of the plurality of gain-adjusted integrated gyroscopic sensor data with observed magnetic sensor data to create a plurality of error measures, and wherein determining the updated gyroscopic sensor gain parameter includes determining an expected gyroscopic sensor gain parameter based on the plurality of error measures; and selecting a subsequent plurality of stored gyroscopic sensor gain parameters for use with a subsequent time-series of gyroscopic data based on the plurality of error measures.

2. The electronic device of claim 1, wherein the selecting the subsequent plurality of stored gyroscopic sensor gain parameters is performed to include a first gyroscopic sensor gain parameter that is significantly less than the expected gyroscopic sensor gain parameter and a second gyroscopic sensor gain parameter that is significantly more than the expected gyroscopic sensor gain parameter.

3. The electronic device of claim 1, wherein the memory further stores instructions configured to cause the electronic device to modify a rotational orientation bias of the gyro based on the integrated gyroscopic sensor data.

4. The electronic device of claim 1, wherein the period of time is a first period of time and wherein the error measure is a first error measure, the mobile electronic device further comprising:

the memory adapted for storing gyroscopic data from the first period of time and at least one previous period of time;

wherein the memory further stores instructions configured to instruct the microprocessor to:

select the at least one previous period of time; and receive previous gyroscopic sensor data associated with the at least one previous period of time;

wherein the determination of the updated gyroscopic sensor gain parameter is based on the received previous gyroscopic sensor data.

5. A method comprising:

receiving at a processor in an electronic device a time-series of gyroscopic sensor data associated with a period of time from a gyroscopic sensor contained within the electronic device, wherein the electronic device contains a memory storing a stored gain parameter that is adapted to be applied to gyroscopic sensor data produced by the gyroscopic sensor, and wherein the stored gyroscopic sensor gain parameter is a first stored gyroscopic sensor gain parameter of a plurality of stored gyroscopic sensor gain parameters;

integrating the time-series of gyroscopic sensor data into a gyroscopic quaternion;

receiving a time-series of magnetic sensor data associated with the period of time from a magnetic sensor contained within the electronic device;

converting the time-series of magnetic sensor data into a magnetic quaternion;

comparing the gyroscopic quaternion with the magnetic quaternion to create an error measure for the period of time;

determining an updated gyroscopic sensor gain parameter based on the error measure;

causing the stored gyroscopic sensor gain parameter to be changed to the updated gyroscopic sensor gain parameter such that subsequent gyroscopic sensor data shall be adjusted by the updated gyroscopic sensor gain parameter;

wherein integrating the time-series of gyroscopic sensor data is performed using each of the plurality of stored gyroscopic sensor gain parameters to create a plurality of gain-adjusted integrated gyroscopic quaternions, wherein comparing the integrated gyroscopic quaternions include comparing each of the plurality of gain-adjusted integrated gyroscopic quaternions with observed magnetic sensor data to create a plurality of error quaternions, and wherein determining the updated gyroscopic sensor gain parameter includes determining an expected gyroscopic sensor gain parameter based on the plurality of error quaternions; and selecting a subsequent plurality of stored gyroscopic sensor gain parameters for use with a subsequent time-series of gyroscopic data based on the plurality of error quaternions.

6. The method of claim 5, wherein the selecting the subsequent plurality of stored gyroscopic sensor gain parameters is performed to include a first gyroscopic sensor gain parameter that is significantly less than the expected optimal gyroscopic sensor gain parameter and a second gyroscopic sensor gain parameter that is significantly more than the optimal gyroscopic sensor gain parameter.

7. The method of claim 5, wherein the period of time is a first period of time and wherein the causing is performed in real-time before a second period of time commences.

8. The method of claim 5, further comprising:

modifying a rotational orientation bias of the gyro sensor based on the gyroscopic quaternion.

* * * * *